United States Patent [19]

Sauber

[11] Patent Number: 4,905,145

[45] Date of Patent: Feb. 27, 1990

[54] MULTIPROCESSOR

[75] Inventor: William F. Sauber, Austin, Tex.

[73] Assignee: Texas Instruments Incorporated, Dallas, Tex.

[21] Appl. No.: 273,140

[22] Filed: Nov. 15, 1988

Related U.S. Application Data

[63] Continuation of Ser. No. 22,501, Mar. 6, 1987, abandoned, which is a continuation of Ser. No. 611,298, May 17, 1984, abandoned.

[51] Int. Cl.$^4$ .............................................. G06F 15/16
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,444,525 | 5/1969 | Barlow et al. | 364/200 |
| 3,581,291 | 5/1971 | Iwamoto et al. | 364/200 |
| 3,771,137 | 11/1973 | Barner et al. | 364/200 |
| 3,934,232 | 1/1976 | Curley et al. | 364/200 |
| 4,015,242 | 3/1977 | Anceau et al. | 364/200 |
| 4,197,589 | 4/1980 | Cornish et al. | 364/900 |
| 4,214,305 | 7/1980 | Tokita et al. | 364/200 |
| 4,228,496 | 10/1980 | Katzman et al. | 364/200 |
| 4,240,143 | 12/1980 | Besemer et al. | 364/200 |
| 4,253,146 | 2/1981 | Bellamy et al. | 364/200 |
| 4,387,427 | 6/1983 | Cox et al. | 364/200 |
| 4,402,046 | 8/1983 | Cox et al. | 364/200 |
| 4,402,059 | 8/1983 | Kennon et al. | 364/200 |
| 4,404,628 | 9/1983 | Angelo | 364/200 |
| 4,428,043 | 1/1984 | Catiller et al. | 364/200 |
| 4,485,438 | 11/1984 | Myrmo et al. | 364/200 |
| 4,493,021 | 1/1985 | Agrawal et al. | 364/200 |
| 4,513,370 | 4/1985 | Ziv et al. | 364/200 |
| 4,539,655 | 9/1985 | Trussell et al. | 364/900 |

Primary Examiner—Gary V. Harkcom
Assistant Examiner—Christopher H. Lynt
Attorney, Agent, or Firm—René E. Grossman; Melvin Sharp

[57] ABSTRACT

A multiprocessor which includes a plurality of processing units interconnected by a global bus. Each processing unit has the capability for initiating control instructions including notification instructions and for selectively transmitting the control instructions over the global bus to the plurality of processing units and trigger device for initiating execution of the control instructions as a destination processing unit. A multiprocessor so constructed is capable of executing blocks of instructions sequentially or concurrently or both at required by a single program to reduce program execution time to a minimum.

34 Claims, 19 Drawing Sheets

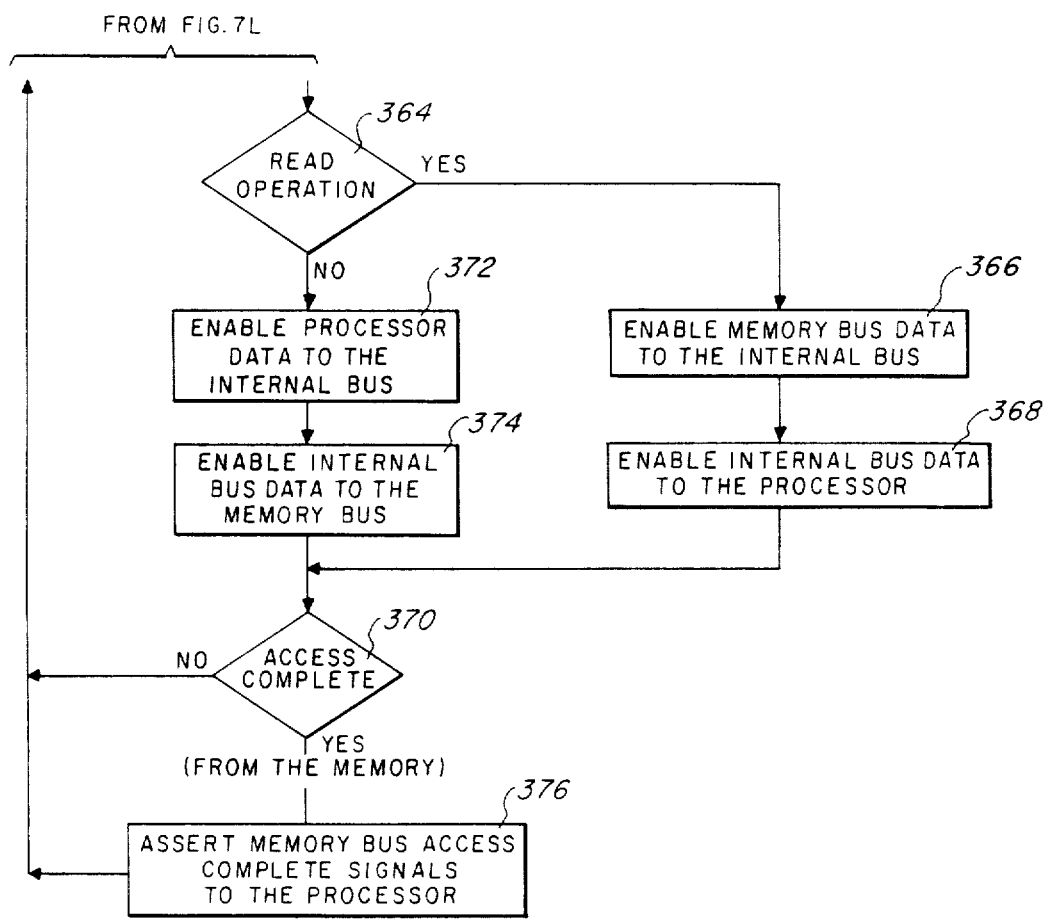
Fig. 7L(1)

MULTIPROCESSOR

This application is a continuation, of application Ser. No. 07/022,501, filed Mar. 6, 1987, now abandoned which is a continuation of 06/611,298, filed May 17, 1984, now abandoned.

BACKGROUND OF THE INVENTION

1. Field of the Invention

This invention relates to data processors and more particularly to a multiprocessor system which allows a processing unit to transfer data to another processing unit through memory accesses.

2. Brief Description of the Prior Art

In the past, multiprocessor computer systems have been impaired by inadequate support for control of execution among processors. The work load has been distributed among the processors by assigning a program to each processor. Nevertheless, additional applications could be met by partitioning the work associated with a single program among the processors. That is, a need exists for a multiprocessor system capable of executing concurrently a single program divided into independent parts.

Further, the minimum execution time depends on the number of processors which can be effectively utilized. Although this number may be application dependent, it is also restricted by the efficiency of communication between the processors. For multiple processors to work on one program, they must be able to share and exchange both data and control information. In other words they must cooperate. Cooperation among the processors of existing multiple processors is provided through software implemented scheduling functions. These software scheduling functions control processor activation; however, such control functions in existing architectures do not use efficient interprocessor communication mechanisms.

SUMMARY OF THE INVENTION

Accordingly, it is an object of this invention to provide an improved multiprocessor which is simple in construction, inexpensive and easy to program.

Another object of this invention is to provide a multiprocessor having extended application capability.

Yet another object of this invention is to provide more efficient hardware support for control of execution in multiprocessor computer systems.

Still another object of this invention is to provide hardware support mechanisms for control of execution of partitioned programs or multiple programs in systems composed of multiple "small" processors.

Briefly stated, this invention consists of the initiation of a "notify" instruction in a processing unit, routing the "notify" through a global memory system, and completing the "notify" in a destination processing unit. This "notify" operation is one of many possible types of sequencing operations and sequencing operations are examples of many possible types of control operations.

The term "control operation" refers to data processing functions such as resource sharing control and sequence of instruction execution control. The term "sequencing operation" is limited to refer to sequence of instruction execution control. A "notify" is a sequencing operation. The generalized innovation is a technique for enhancing conventional multiprocessor processors, memory interfaces, and buses to improve the efficiency of multiprocessor control operations.

Data flow sequencing is a mechanism which is capable of controlling the execution of arbitrary operations distributed among multiple processors. Examples of the operations are: tasks, subroutines, blocks of instructions and even single instructions. Certain hardware implementations of this mechanism are disclosed in U.S. Pat. No. 4,197,589 issued Apr. 8, 1980 to Merrill A. Cornish et al. assignors to Texas Instruments Incorporated. Data flow sequencing is an example of a control mechanism which would benefit from the invention.

BRIEF DESCRIPTION OF THE DRAWINGS

The novel features characteristic of the embodiment of the invention may best be understood by reference to the following detailed description when read in conjunction with the accompanying drawings, wherein.

In the description of the preferred embodiment, data flow sequencing is applied to blocks of instructions where a block of instructions is any sequence of conventional program counter sequenced instructions (loads, branches, adds, etc.). This sequencing is based on principles as follows:

a block of instructions knows how many operands it needs in order to execute;

a block of instructions knows which of the other blocks require the results of its execution;

an executing block notifies other blocks as results become available;

a block counts the notifications received, and a block may execute when the proper number of notifications have been received.

DESCRIPTION OF THE PREFERRED EMBODIMENT

Figure 1:
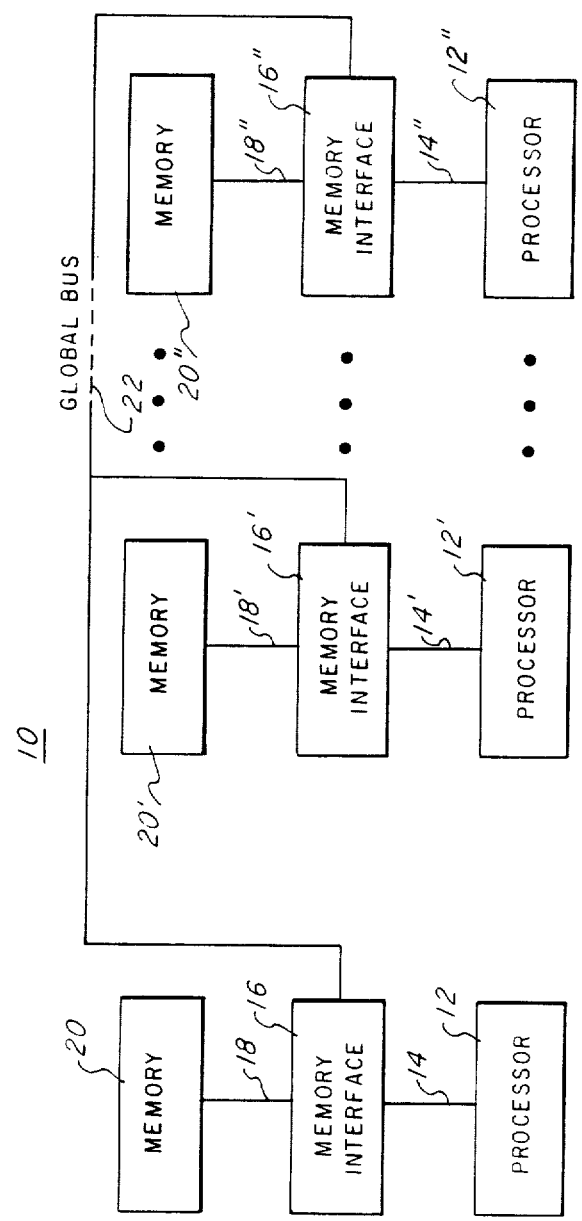
FIG. 1 is a block diagram of the multiprocessor constituting the invention.

Referring now to FIG. 1, the multiprocessor 10 comprises a plurality of processors 12, 12'; 12" connected by control, address/data busses 14, 14', 14" to a plurality of memory interface mechanisms 16, 16', 16". The plurality of memory interface mechanisms are connected by control, address/data busses 18, 18', 18" to a plurality of memorys 20, 20', 20" and are interconnected by a control, address/data global bus 22. The processors 12, 12', 12" may be, for example, microprocessors such as the TI-9900 sold by Texas Instruments Incorporated modified as hereinafter described.

PROCESSOR

Figure 2:
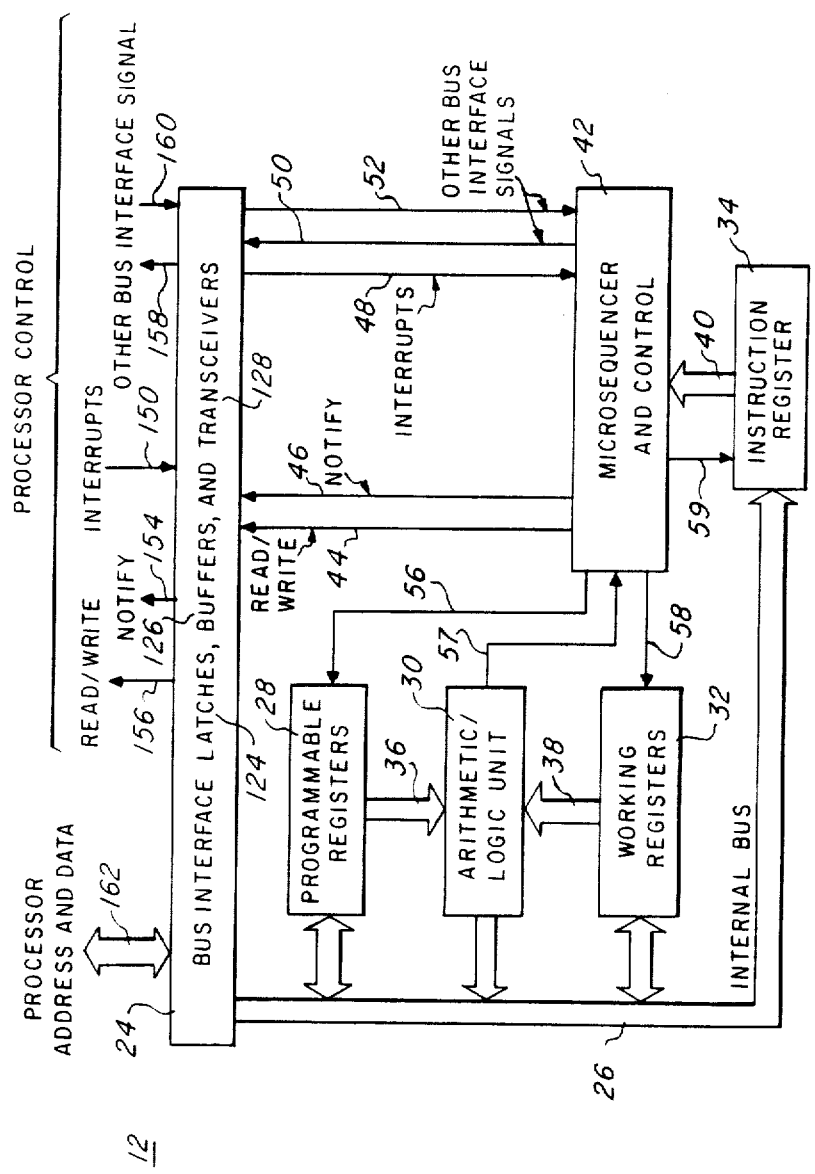
FIG. 2 is a block diagram of a processor generic to the processing unit of the multiprocessor.

Referring now to FIG. 2, each processor 12 is identical in construction, thus only one will be described. The processor 12 comprises a block 24 of interface latches, buffers and transceivers. The bus 14, which interconnects the processor 12 to the memory interface 16 has processor address and data bus leads 162 and processor control input leads 150 and 160 for inputting interrupts and other control signals to the block 24 of latches, buffers and transceivers and output leads 154, 156 and 158 for outputting notify, read/write and other bus interface signals from the block 24 of bus interface latches, buffers and transceivers. An internal bus connects block 24 of latches, buffers, and transceivers to programmable registers 28, an arithmetic/logic unit (ALU) 30, working registers 32 and an instruction register 34. Buses 36 and 38 connect, respectively, the programmable, registers 28 and working registers 32 to the ALU 30, while a bus 40 connects the instruction register 34 to a microsequencer and control mechanism 42.

The microsequencer and control mechanism 42 has a plurality of input/output terminals connected to the block 24 of interface latches, buffers and transceivers by leads as follows: a read/write terminal lead 44, a notify lead 46, an interrupt lead 48 and other bus interface signals in and out leads 50 and 52. Control leads 56, 57, 58, and 59 connect the programmable registers 28, ALU 30, working register 32 and instruction register 34, respectively, to the microsequencer and control 42.

Figure 3:
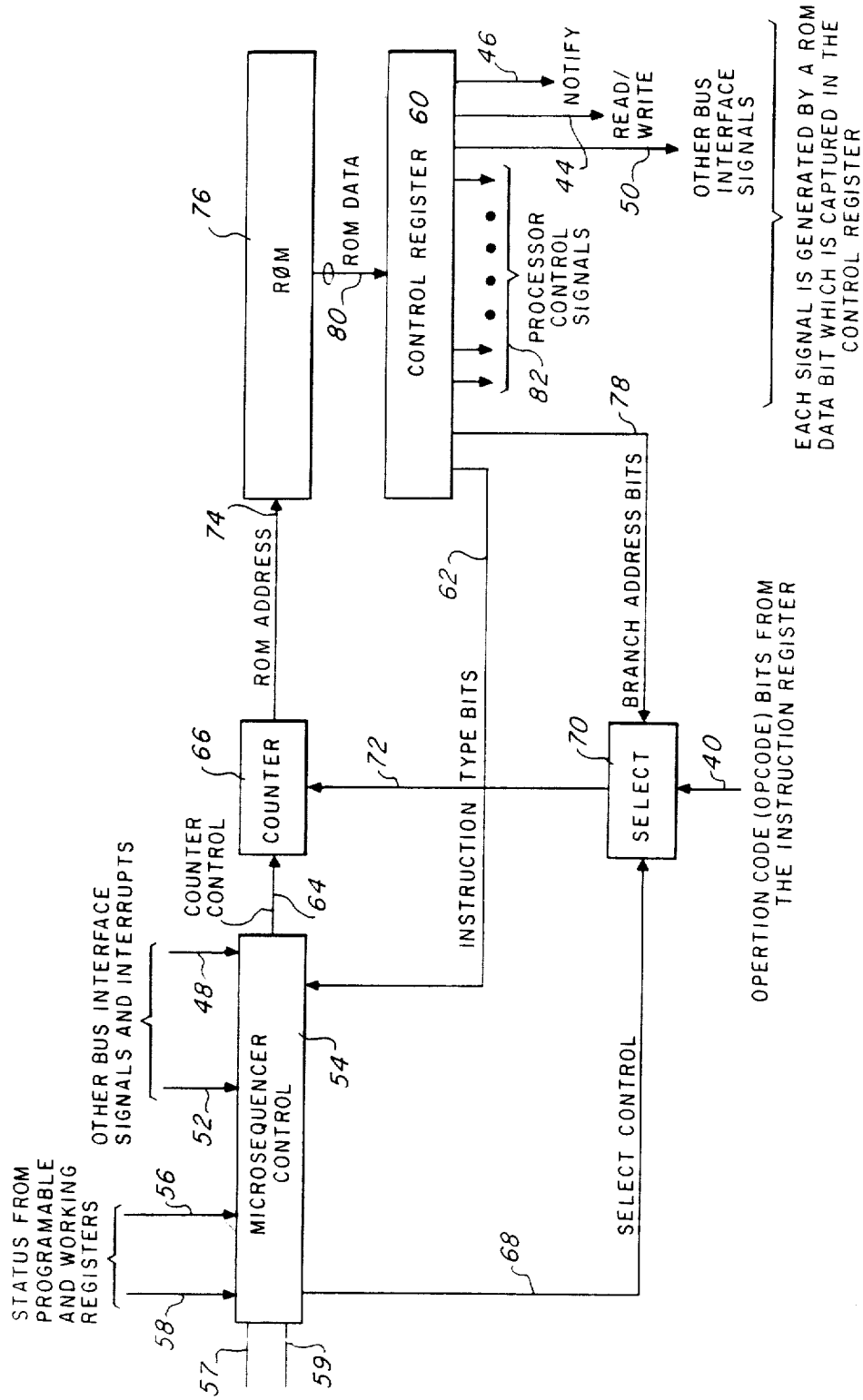
FIG. 3 is a block diagram of the processor's microsequencer with "notify" added.

The microsequencer and control 42 (FIG. 3) includes a microsequencer control 54 which receives system status signals from programmable and working registers 28 and 32, ALU 30 and instruction register 34, respectively, through bus leads 56, 57, 58 and 59, other bus interface signals and interrupts through leads 48 and 52, and instruction type bits from control register 60 through bus 62.

Microsequencer control 54 outputs counter control signals through lead 64 to a counter 66 and select control signals through lead 68 to a selector (multiplexer) 70. The selector 70 receives through lead 40 operation code (OPCODE) bits from the instruction register 34 (FIG. 2) and microsequence branch address bits through lead 78 from the control register 60.

The selector 70 is connected by lead 72 to registers in counter 66. The selector 70 outputs microsequence address information to the counter which stores and increments the address information to generate ROM addresses. The counter 66 is connected by lead 74 to OM 76. ROM 76 uses the address information to access ROM data therein.

ROM 76 is connected by bus 80 to control register 60. The control register in response to the ROM data, outputs processor control signals through bus 82 to programmable and working registers 28 and 32, ALU 30, and instruction register 34 and read/write signals through lead 44, notify signals through lead 46 and the other bus interface signals through lead 50 to the bus interface latches, buffers and transceivers block 24.

The processor control signals, notify signals, read/write signals and other bus interface signals are generated by ROM data bits of ROM 76 which are captured in control register 60.

Figure 4:
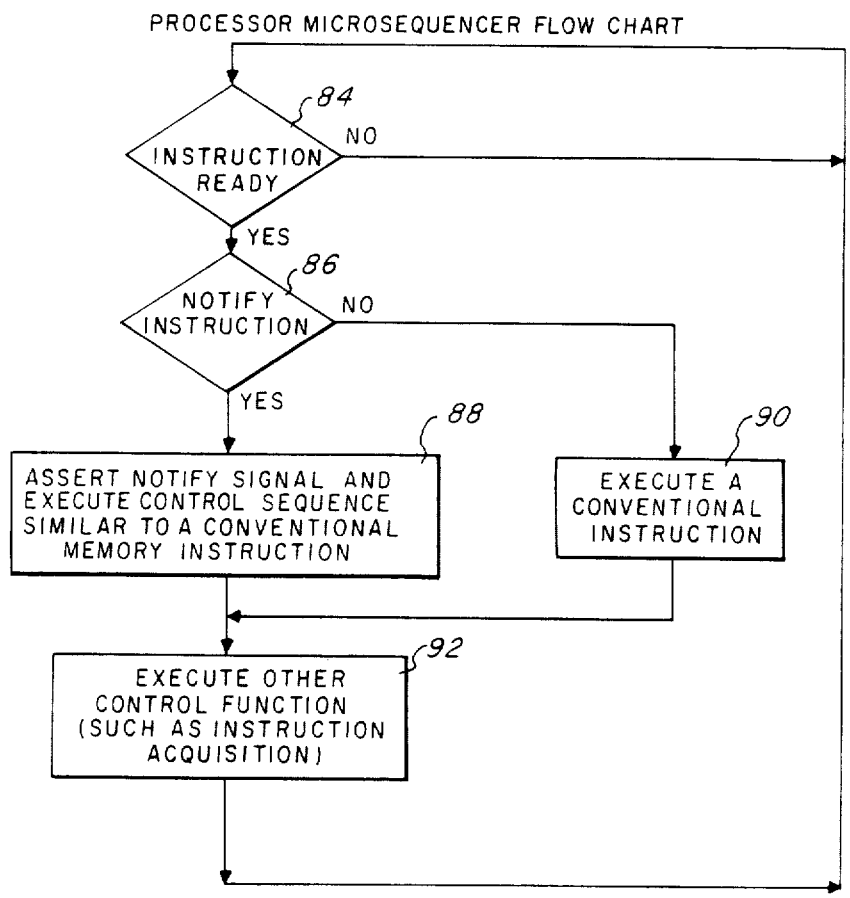
FIG. 4 is a hardware descriptive language flow chart of the microsequencer.

It is to be assumed that interrupt processing may be initiated at any point during instruction execution (memory control interrupt on line 150, FIG. 6) and that, when the processor receives a notify interrupt (line 150, FIG. 6), the memory interface latch 102 (FIG. 5) must be read before any other memory accesses can be processed. (The processor microsequencer operates in accordance with the flow chart of FIG. 4.). Thus a decision 84 is made by controller 54 (FIG. 3) whether an instruction is ready; if NO the decision is repeated until an instruction is ready; if YES, a decision 86 is made whether it is a notify instruction. If the notify instruction decision 86 is YES, a microsequence 88 is executed to generate a notify signal line 46 (FIG. 3) and to execute a control sequence similar to a conventional memory instruction for the applicable processor; if NO, a microsequence 90 is executed for a conventional instruction. The decision 86 occurs through the loading of the OPCODE bits through the selector (40) into the counter registers in (66). After the microsequences 88 or 90, a microsequence 92 is executed by the sequencer control 42, FIG. 3 for other control functions such as, for example, instruction acquisition.

MEMORY INTERFACE

Returning now to FIG. 1, the memory interface mechanism has the control, address/data bus 18 and the Global control, address/data bus 22 for inputting information to and outputting information from the memory interface; these buses are in addition to the processor bus 14.

The memory interface 16 (FIG. 5) contains an internal bus 97 which includes an address portion 94 and a data portion 96. Address bits bus 94 receives address bits selectively from processor, memory and global buses (14, 18 and 22) through buffers and transceivers 124, 126 and 128 connected, respectively, by buses 118, 120 and 122 to the data/address bits bus 97 and provides address bits through bus 100 to latch 102. Latch 102 is connected by bus 104 to buffer 106. Buffer 106 is connected by bus 108 to the data bits bus 96 for converting the address bits to data bits. Bus 96 inputs data bits through bus 108 into counter 110. Counter 110 is connected by bus 112 to buffer 114. Buffer 114 is connected by bus 116 back to the data bits bus 96. The counter 110 determines whether an instruction notify requires that the processor be interrupted.

The data/address bits internal bus 97 is connected by buses 118, 120 and 122, respectively, back to the first and second blocks of buffers and transceivers 124 and 126 and to the block of transceivers 128. The block of buffers and transceivers 124 are connected to bus 18 which includes leads 164, 166, 168 (FIG. 6) connected to control 130 (FIG. 5) to control address/data to and from the memory 20 (FIG. 1). The block of buffers and transceivers 126 (FIG. 5) are connected to bus 14 and bus 132. Bus 14 includes bus control leads 150, 154, 156, 158 and 160 (FIG. 6) connected to control 130 (FIG. 5); bus 132 is connected to a decoder 134. The decoder 134 is connected to control 130 and detects addresses resident in local memory for the controller 130. Finally, the block of transceivers 128 are connected to buses 22 and 136. Bus 22 includes bus control leads 142, 144 and 146 (FIG. 6) connected to control 130 (FIG. 5) through buffers and transceivers 148 (FIG. 6); bus 136 is connected to decoder 138. Decoder 138 is connected to control 130 and detects addresses resident in local memory for the controller 130.

Controller 130 (FIGS. 5 and 6) is connected by lead 140 to the latch 102 (FIG. 5), buffers 106 and 114, counter 110, buffers and transceivers 124 and 126 and transceivers 128. The terms "lead 140" and "line 140" will be used to refer to the many signals used to control the blocks in FIG. 5.

The controller's bus control leads (FIG. 6) of processor bus 14, memory bus 18 and global bus 22 are as follows. The global bus control leads 142, 144 and 146 are, respectively, a notify lead, a read/write lead and other control leads 146. The buffers and transceivers CESSOR REQUEST decision 242 is YES, then a PROCESSOR ADDRESSING THE LATCH decision 244 is made. The decoder (134, FIG. 5) detects a dedicated address occupied by the memory interface address latch 102 which now contains the memory address of a ready block.) If the PROCESSOR ADDRESSING THE LATCH decision is NO, the INTERRUPT state is repeated; if YES, an ASSERT ACCESS COMPLETE SIGNALS TO THE PROCESSOR action 246 (line 160, FIG. 6) is taken and the system enters the INTERRUPT ACKNOWLEDGE 350 (FIG. 7l) state.

In the interrupt acknowledge state 350 (FIG. 7l) a decision 352 is made whether a PROCESSOR REQUEST (158, FIG. 6) is present. If NO, the decision is repeated; if YES, a decision 354 is made whether PROCESSOR IS ADDRESSING THE LATCH (1000, FIGS. 5 & 6). If YES, an action 356 to ASSERT ACCESS COMPLETE SIGNALS TO THE PROCESSOR 160, FIG. 6) is asserted and then the system is returned to IDLE 170; If NO, signals are asserted as follows: an ENABLE PROCESSOR ADDRESS (14 address, FIG. 1) TO THE INTERNAL BUS (97 address, FIG. 5) signal 358 (line 140, FIG. 6); An ENABLE INTERNAL BUS ADDRESS (97 address, FIG. 5) TO THE MEMORY BUS (18 address, FIG. 1) signal 360 (line 140, FIG. 6); and an ASSERT PROCESSOR READ/WRITE AND OTHER CONTROL SIGNALS (156, 158, FIG. 6) ON THE MEMORY BUS (164, 168, FIG. 6) actions 362. Next, a decision 364 is made whether a READ OPERATION (156, FIG. 6) is present. If YES, signals are asserted as follows: ENABLE MEMORY BUS DATA (18 data, FIG. 1) TO THE INTERNAL BUS (97 data, FIG. 5) signal 366, (140, FIG. 5); and ENABLE INTERNAL BUS DATA (97 data, FIG. 5) TO THE PROCESSOR (14 data, FIG. 1) signal 368 (140, FIG. 5). Next a decision 370 is made whether ACCESS is COMPLETE. If the decision 364 is NO, signals are asserted as follows: ENABLE PROCESSOR DATA (14 data, FIG. 1) TO THE INTERNAL BUS (97 data, FIG. 5) signal 372 (140, FIG. 6); ENABLE INTERNAL BUS DATA (97 data, FIG. 5) TO THE MEMORY BUS (18 data, FIG. 1) signal 374. The decision 370 whether access is complete is then made. If NO, the interrupt acknowledge state is repeated until either decision 354 (PROCESSOR ADDRESSING THE LATCH) or decision 366 (ACCESS COMPLETE) is YES. If decision 370 is YES, an ASSERT MEMORY BUS ACCESS COMPLETE SIGNALS TO THE PROCESSOR (160, FIG. 6) action 376 is taken and the INTERRUPT ACKNOWLEDGE STATE REPEATED until the decision 354 whether the processor is addressing the latch is YES and the ASSERT ACCESS COMPLETE SIGNALS TO THE PROCESSOR (160, FIG. 6) action 356 is taken, after which the system reverts to IDLE 170.

The GLOBAL NEW COUNT state 234 (FIG. 7f) begins with signals asserted as follows: a signal 248 to ENABLE GLOBAL BUS ADDRESS (22 address portion, FIG. 1) TO THE INTERNAL BUS (97 address portion, FIG. 5) (line 140, FIG. 6) signal 250 to ENABLE INTERNAL BUS ADDRESS (97 address, FIG. 5) TO THE MEMORY BUS (18 address, FIG. 1) (line 140, FIG. 5), signal 252 to ENABLE COUNTER (110, FIG. 5) TO THE INTERNAL BUS (DATA) (96, FIG. 5) (line 140, FIG. 5), signal 254 to ENABLE INTERNAL BUS DATA (96, FIG. 5) TO THE MEMORY BUS (18 data, FIG. 1 (line 140, FIG. 6), and actions 256 to ASSERT WRITE (164, FIG. 6) OPERATION AND OTHER CONTROL SIGNALS (168, FIG. 6) ON THE MEMORY BUS. After actions 248-256 are taken an ACCESS COMPLETE (166, FIG. 6) decision 258 is made; if NO, the GLOBAL NEW COUNT state 234 is repeated. If the ACCESS COMPLETE decision 258 is YES, an ASSERT ACCESS COMPLETE (146, FIG. 6) SIGNALS ON THE GLOBAL BUS action 260 is taken (line 148, FIG. 6) and the system returned to the IDLE 170 (FIG. 7a) state.

Returning now to FIG. 7a, the LOCAL state 182 which is followed if the PROCESSOR REQUEST decision 178 (FIG. 7a) and the PROCESSOR ADDRESS RESIDENT decision 180 are affirmative will now be described. The LOCAL state 182 (FIG. 7g) begins with actions being taken as follows: an ENABLE PROCESSOR ADDRESS (14 address, FIG. 1) TO THE INTERNAL BUS (97 address, FIG. 5) signal 262 (line 140, FIG. 5) and an ENABLE INTERNAL BUS ADDRESS (97 address, FIG. 5) TO THE MEMORY BUS (18 address, FIG. 1) signal 264 (line 140, FIG. 5). After the signals 262 and 264 are asserted, a NOTIFY OPERATION decision 266 is made (line 154, FIG. 6); if NO, an ASSERT PROCESSOR READ/WRITE AND OTHER CONTROL SIGNALS (156, 158, FIG. 6) ON THE MEMORY BUS (164, 168, FIG. 6) actions 268 are taken and a READ OPERATION decision 270 is made (line 156, FIG. 6). If the READ OPERATION decision is YES, then an ENABLE MEMORY BUS DATA (18 data, FIG. 1) TO THE INTERNAL BUS (97 data, FIG. 5) signal 272 (line 140, FIG. 6) and an ENABLE INTERNAL BUS DATA (97 data, FIG. 5) TO THE PROCESSOR signal 274 (line 140, FIG. 6) are asserted and an ACCESS COMPLETE decision 276 is made. However, if the READ OPERATION (156, FIG. 6) decision is NO, then an ENABLE PROCESSOR DATA (14 data, FIG. 1) TO THE INTERNAL BUS (97 data, FIG. 5) signal 278 (line 140, FIG. 6) and an ENABLE INTERNAL BUS DATA (97 data, FIG. 5) TO THE MEMORY BUS (18 data, FIG. 1) signal 280 (line 140, FIG. 5) are asserted and the ACCESS COMPLETE (166, FIG. 6) decision 276 is made. If the ACCESS COMPLETE (166, FIG. 6) decision 276 is NO, the LOCAL state 182 is repeated; if YES, an ASSERT MEMORY BUS ACCESS COMPLETE SIGNALS (166, FIG. 6) TO THE PROCESSOR (160, FIG. 6) action 282 is taken (line 160, FIG. 6) and the system returned to the IDLE 170 state. If the NOTIFY OPERATION (154, FIG. 6) decision 266 is YES then the LOCAL state continues with LOCAL NOTIFY 284.

The LOCAL NOTIFY 284 (FIG. 7h) is a continuation of the LOCAL 282 state and begins with the assertion of signals as follows: a signal 286 (line 140, FIG. 5) to LOAD THE LATCH (102, FIG. 5) WITH INTERNAL BUS ADDRESS (94, FIG. 5) which allows a processor 12 to read the address of a ready block if the predecessor count (counter 110, FIG. 5) becomes zero and the processor 12 is interrupted at the completion of the notify; actions 288 to ASSERT READ OPERATION AND OTHER CONTROL SIGNALS ON THE MEMORY BUS (lines 164, and 168, FIG. 6); signal 290 to ENABLE MEMORY BUS (18 data, FIG. 1) DATA TO THE INTERNAL BUS (97 data, FIG. 5) (line 140, FIG. 5) and signal 292 to LOAD THE DATA ON THE INTERNAL BUS (96, FIG. 5) INTO THE COUNTER (110, FIG. 5) (line 140, FIG.

148 prevent simultaneous use of the global bus 22 by controllers 130 in 16, 16', and 16". The block of buffers and transceivers 148 are connected to controller 130 by notify lead 142', read/write lead 144' and the other control signals lead 146'. A controller 130 buffer and transceivers control bus lead 147 which interconnects the controller 130 to the block of buffers and transceivers 148 allows the controller to control the operation of the buffers and transceivers 148.

The processor bus 14 which connects the bus interface latches, buffers, and transceivers 24 (FIG. 2) to the controller 130 (FIGS. 5 and 6) has interconnecting leads 150, 154, 156, 158 and 160 as follows: an interrupt lead 150 to which other interrupt bus leads 152 are connected for interrupting the processor, a notify lead 154 for a notify signal coming from the processor, a read/write lead 156, an other control signals input lead 158 and an other control signals output lead 160.

The memory bus 18, which connects the memory 20 to the controller 130 has the memory bus control leads 164, 166 and 168 which are, respectively, a read/write lead and other control input leads 166 and other control output leads 168. It is to be noted that memory does not have a notify lead and does not receive a notify signal.

MULTIPROCESS HARDWARE DESCRIPTION FLOW CHART

Referring now to FIGS. 7a-7l, a hardware description flow chart is used to describe the structure of the multiprocessor system.

When the multiprocessor system is initialized the memory controller 130 (FIG. 6) is in the IDLE 170 state and a decision 172 is made (global bus control lead 146a) whether a GLOBAL BUS REQUEST has been made; if YES a decision 174 is made whether the request is a RESIDENT GLOBAL BUS ADDRESS. The decoder 138 (FIG. 5) detects addresses resident in the local memory 20 (FIG. 1). If the Global Bus Address Resident decision 174 is YES a transition is made to the Global state 176; if NO, or if the GLOBAL BUS REQUEST decision 172 is NO, a decision 178 is made (processor control bus lead 158, FIG. 6) whether a PROCESSOR REQUEST 178 exists. If YES, a decision 180 is made whether the request is a resident processor address (decoder 134, FIG. 5) detects addresses resident in the local memory 20 (FIG. 1)); if YES a transition is made to the LOCAL state 182. If the PROCESSOR ADDRESS RESIDENT decision 180 is NO, then arbitration 184 is made (global bus control lead 146b FIG. 6) for the global bus and a decision 186 is made (global bus control lead 146c, FIG. 6) whether GLOBAL BUS ACCESS is granted. If the GLOBAL BUS ACCESS GRANTED decision is YES then a transition is made to the REMOTE 188 state; if NO or if the PROCESSOR REQUEST decision 178 is NO, then the memory controller state is repeated beginning with the GLOBAL BUS REQUEST 172.

Figure 5:
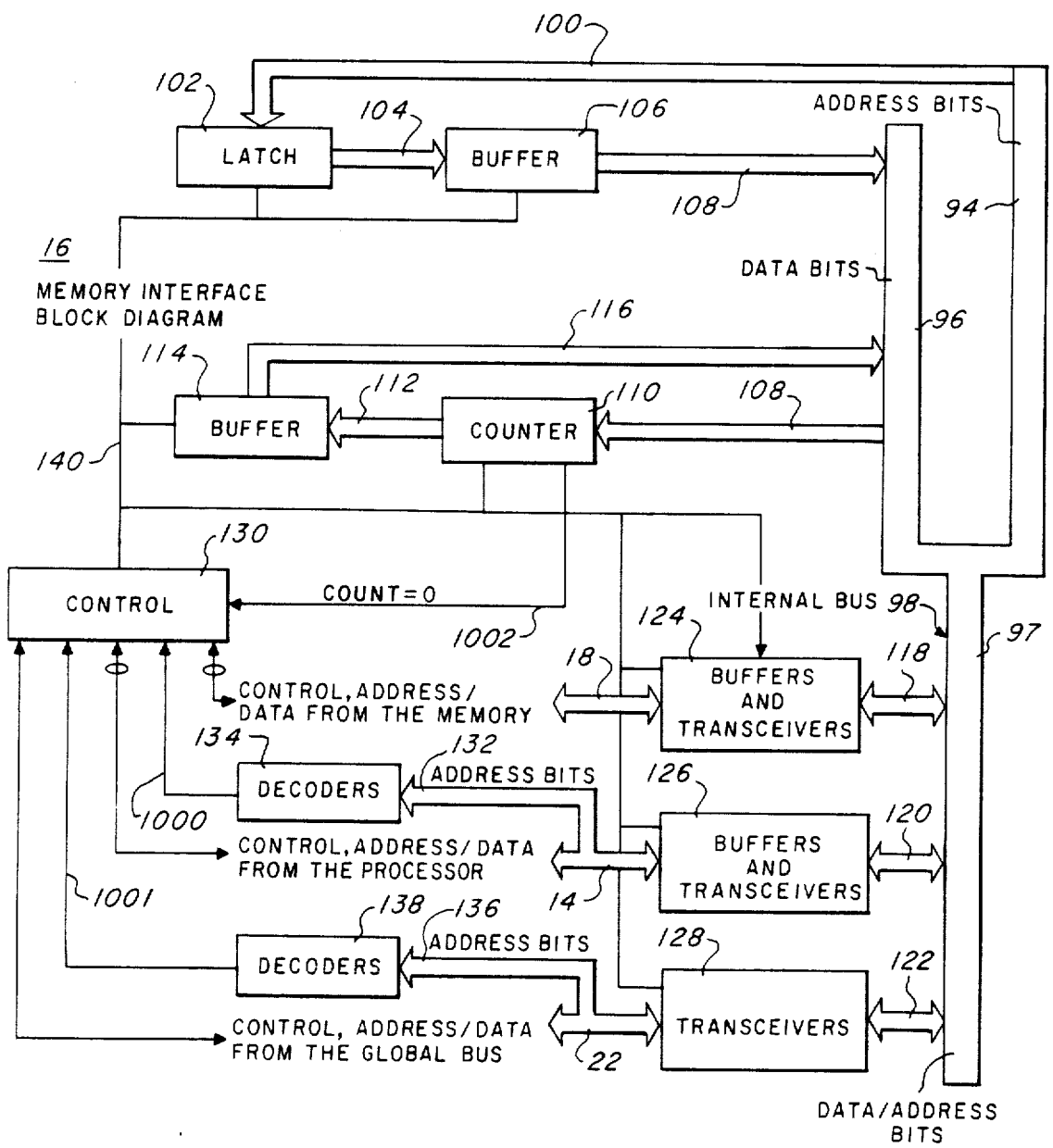
FIG. 5 is a block diagram of a memory interface for each processor of the multiprocessor.
Figure 6:
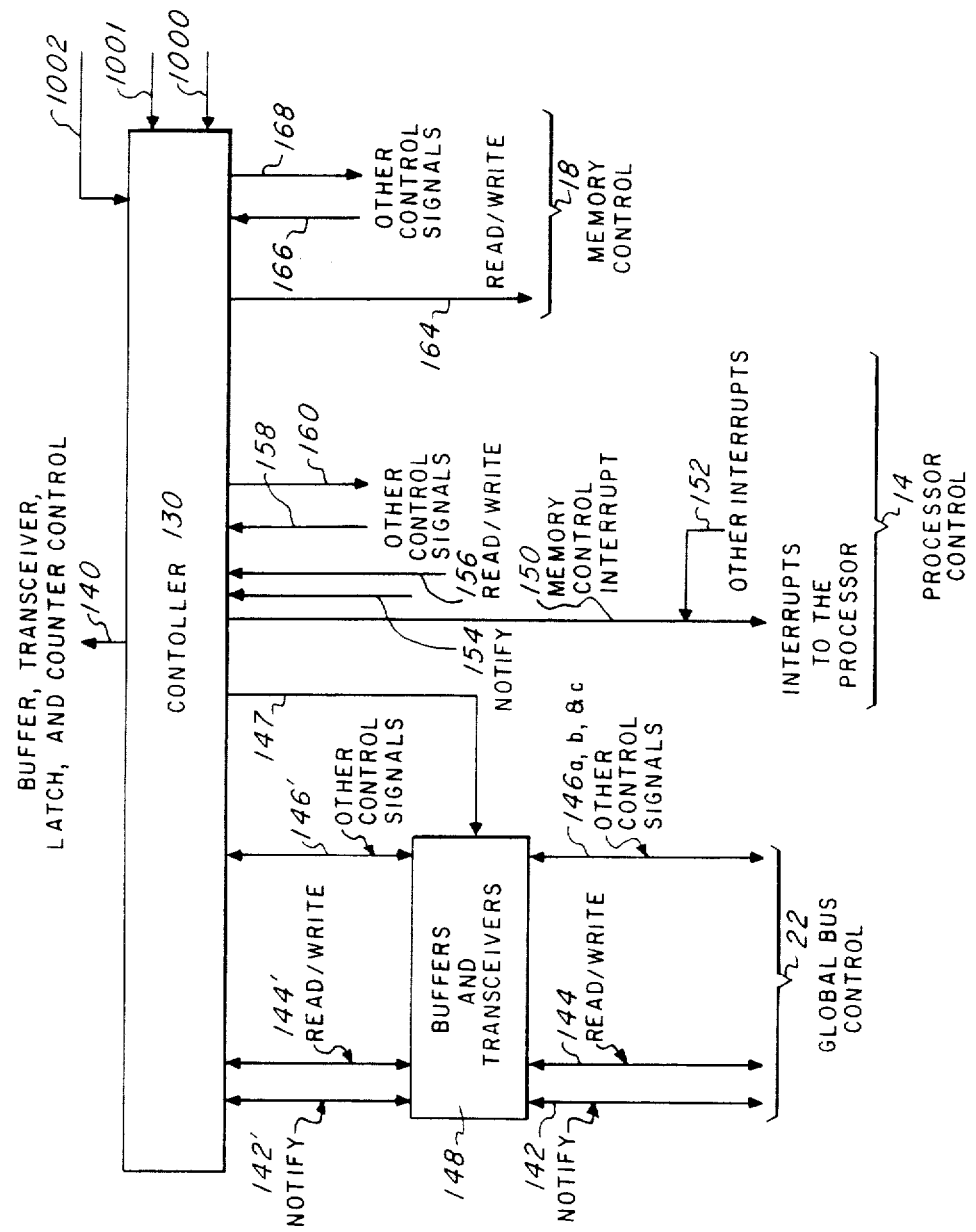
FIG. 6 is an expanded block diagram of the control for the memory interface.

The GLOBAL transition state 176 (FIG. 7c) includes the assertion of an ENABLE GLOBAL BUS ADDRESS (22 address portion, FIG. 1) TO THE INTERNAL BUS (97, FIG. 5) signal 190 (lead 140, FIG. 6) which is followed by assertion of the ENABLE INTERNAL BUS ADDRESS 97, address portion, FIG. 5) TO THE MEMORY BUS (18, FIG. 1) signal 192 (lead 140, FIG. 6) and a NOTIFY OPERATION decision 194 (line 142', FIG. 6) made. If the NOTIFY OPERATION decision is YES then the GLOBAL state continues with GLOBAL NOTIFY 196; if NO, action 198 to ASSERT GLOBAL BUS READ/WRITE AND OTHER (144, 146d, FIG. 6) CONTROL SIGNALS ON THE MEMORY BUS (18: 164,166,168, FIG. 6) is taken.

Figure 7A:
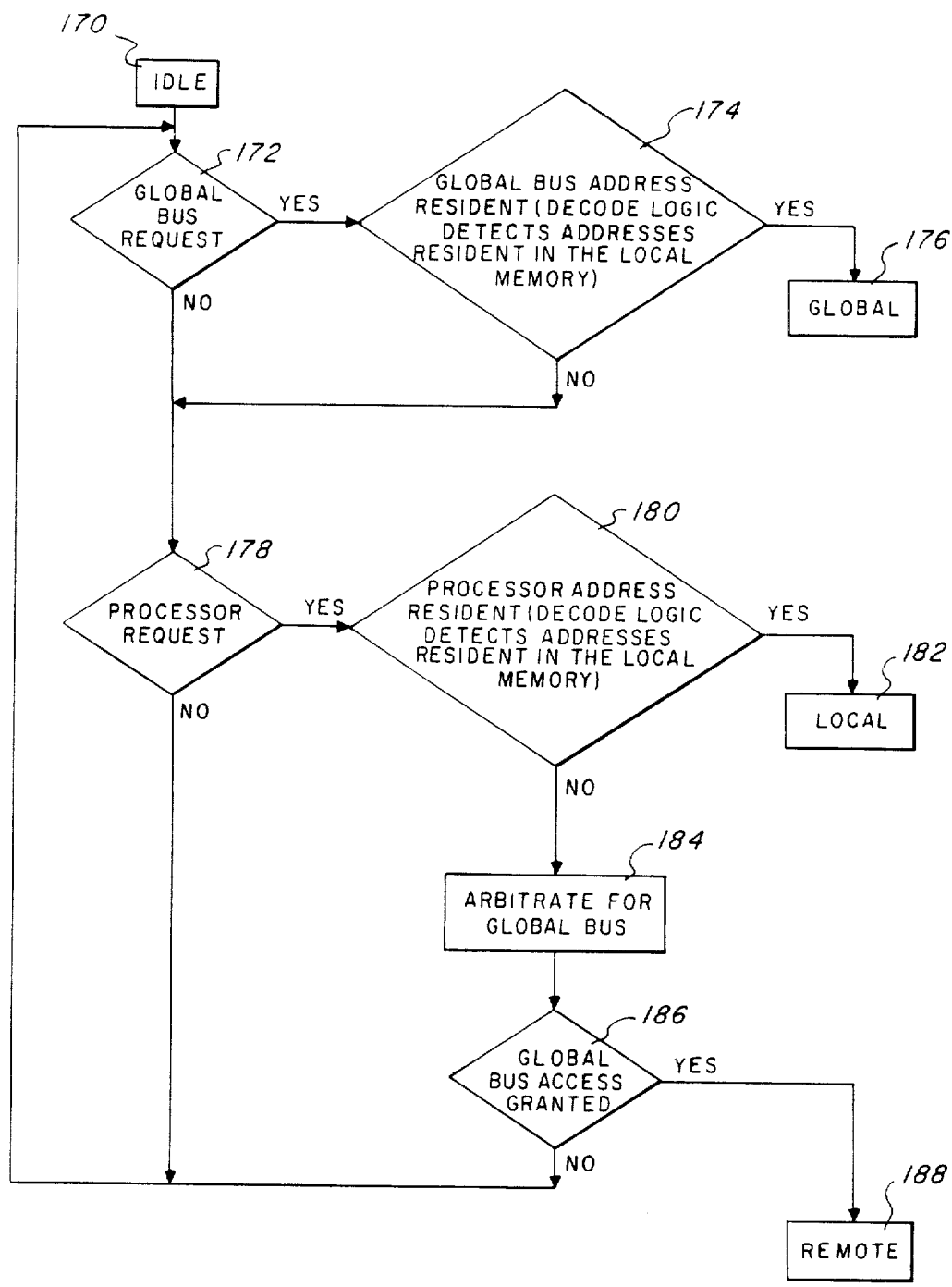
FIGS. 7a-7b constitute a hardware flow chart for the memory controller.
Figure 7B:
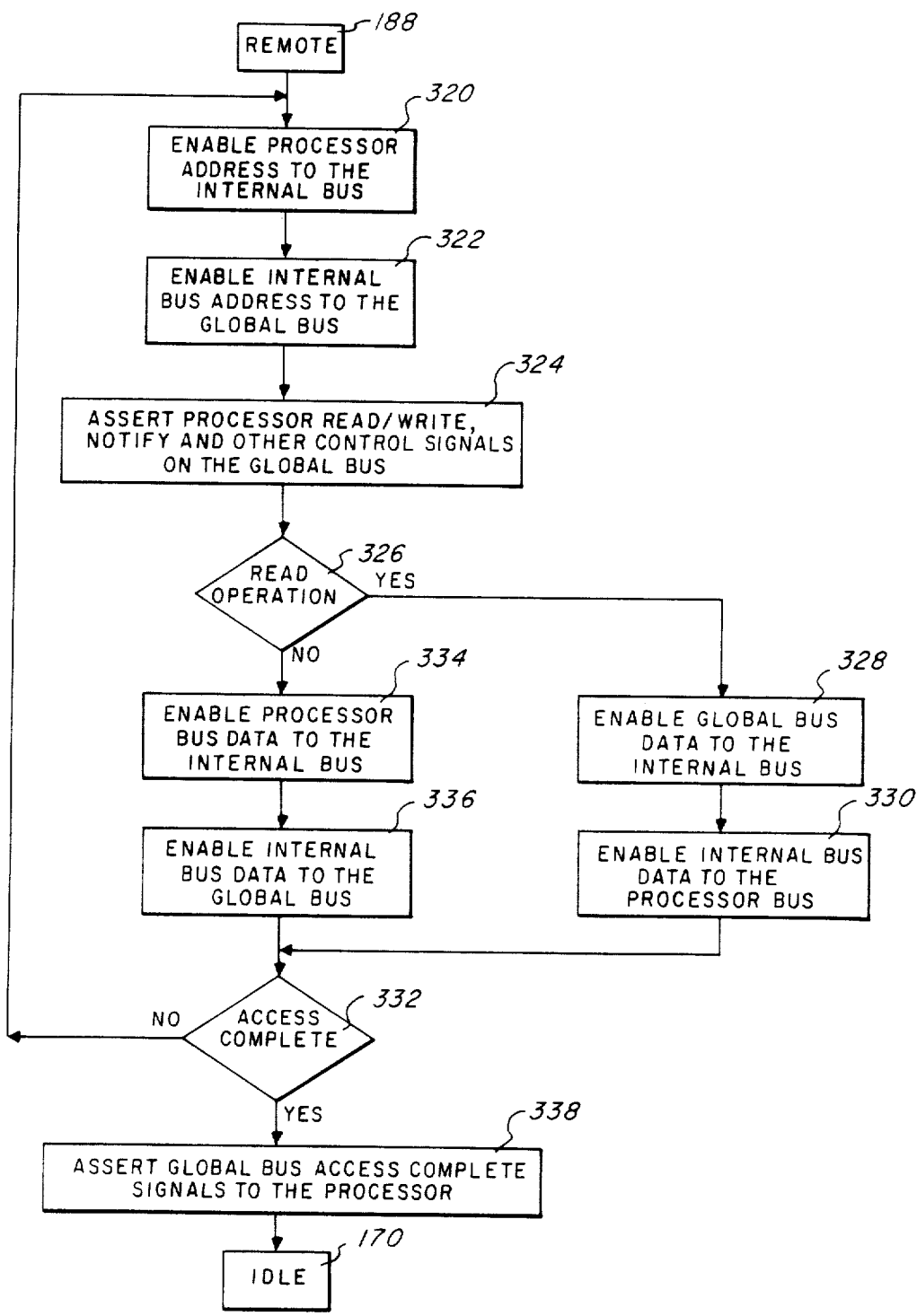
Figure 7C:
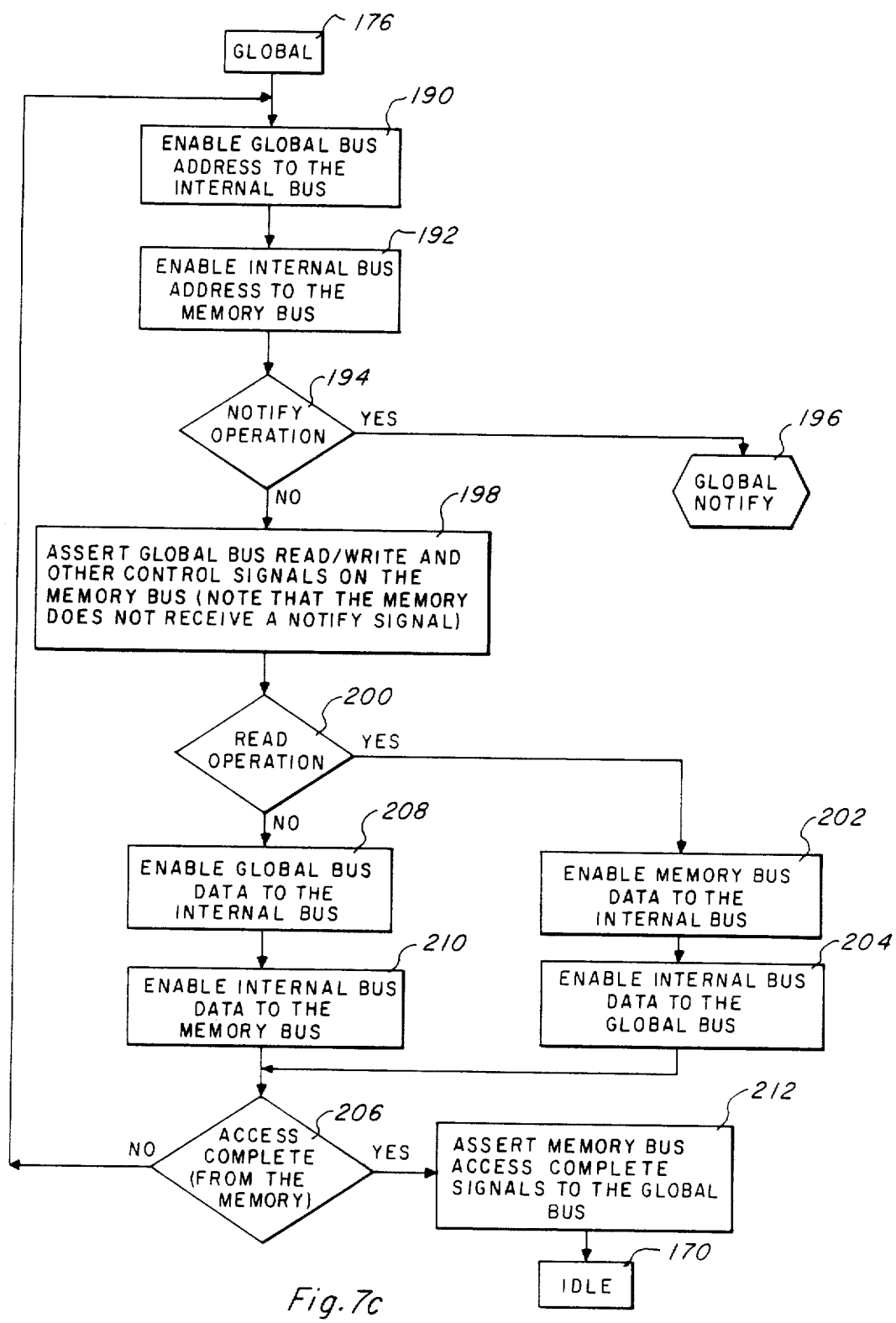
Figure 7D:
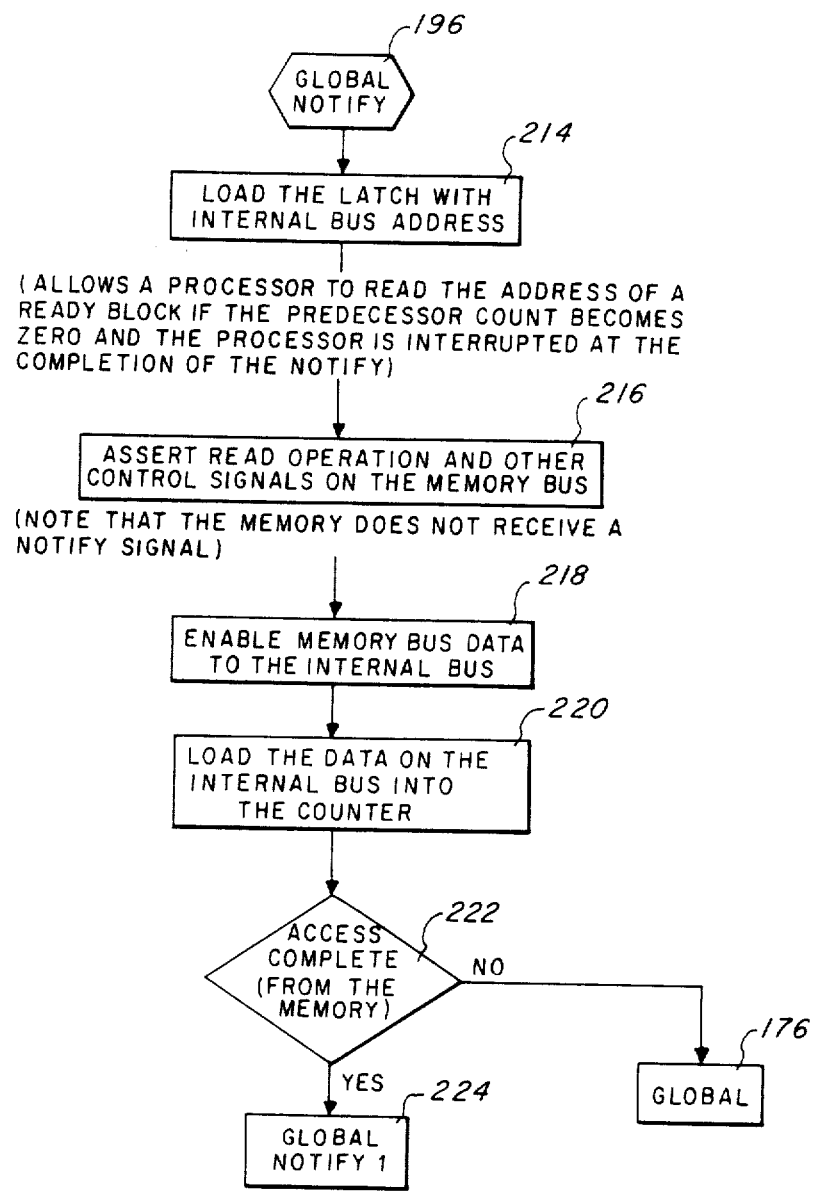
Figure 7E:
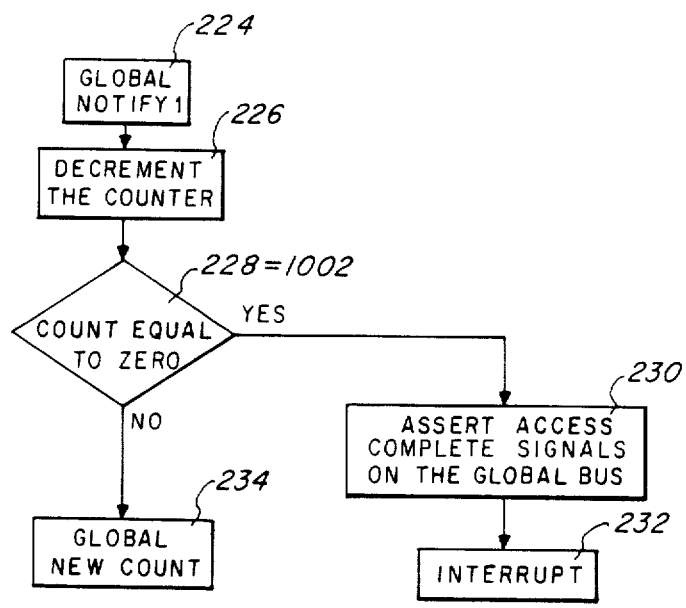
Figure 7F:
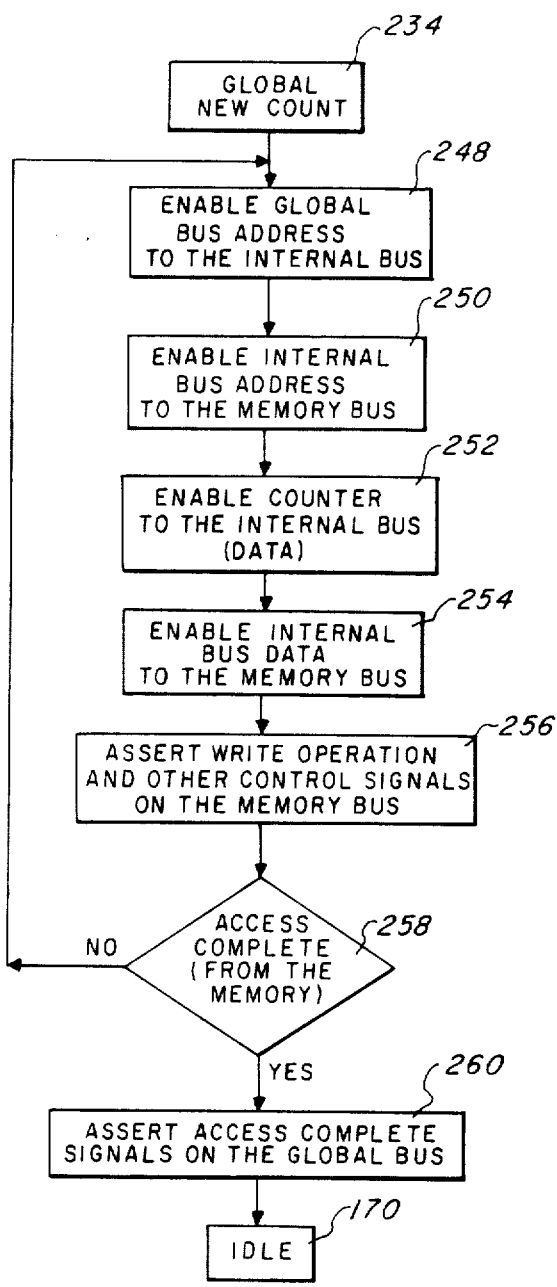

Next, a READ OPERATION (144', FIG. 6) decision 200 is made. If the READ OPERATION decision 200 is YES, a signal 202 to ENABLE MEMORY BUS DATA (18 data portion, FIG. 1) TO THE INTERNAL BUS (97 data portion, FIG. 5) (line 140, FIG. 6) and a signal 204 to ENABLE INTERNAL BUS DATA (97 data portion, FIG. 5) TO THE GLOBAL BUS (22 data, FIG. 1), (line 140, FIG. 6) are asserted and an ACCESS COMPLETE decision 206 made. However, if the READ OPERATION decision 200 is NO, then a signal 208 to ENABLE GLOBAL BUS DATA (22 data port, FIG. 1) TO THE INTERNAL BUS (97 data port, FIG. 5), (line 140, FIG. 6) and a signal 210 to ENABLE INTERNAL BUS DATA (97 data port, FIG. 5) TO THE MEMORY BUS (18 data port, FIG. 1) (line 140, FIG. 6) are asserted and the ACCESS COMPLETE decision 206 made. If the ACCESS COMPLETE decision is NO, the GLOBAL state is repeated; if the decision is YES, an action 212 is taken to ASSERT MEMORY BUS ACCESS COMPLETE SIGNALS (166, FIG. 6) TO THE GLOBAL BUS (146, FIG. 6), and the system returned to IDLE 170 state (FIG. 7a).

The GLOBAL NOTIFY 196, which is a continuation of the GLOBAL state 176 (FIG. 7c), begins (FIG. 7d) with actions as follows: signal 214 to LOAD THE LATCH (102, FIG. 5) WITH INTERNAL BUS ADDRESS (94 through 100, FIG. 5,), (line 140, FIG. 6), actions 216 to ASSERT READ (164, FIG. 6) OPERATION AND OTHER CONTROL SIGNALS (168, FIG. 6) ON THE MEMORY BUS, signal 218 to ENABLE MEMORY BUS DATA (18 data portion, FIG. 1) TO THE INTERNAL BUS (97 data portion, FIG. 5), (line 140, FIG. 6) and a signal 220 to LOAD THE DATA ON THE INTERNAL BUS (96, FIG. 5) INTO THE COUNTER (110, FIG. 5), (line 140, FIG. 5). After the actions 214–220 are taken, an ACCESS COMPLETE (166, FIG. 6) decision 222 is made as to whether access is complete from the memory (line 166, FIG. 6). If the ACCESS COMPLETE decision is NO, the system returns to the beginning of the GLOBAL 176 state; if YES then transition is made to the GLOBAL NOTIFY 1 state 224.

The GLOBAL NOTIFY 1 state (FIG. 7e) begins with a signal 226 to DECREMENT THE COUNTER (line 140, FIG. 5) and a COUNT EQUAL TO ZERO (1002, FIG. 5) decision 228 made. If the COUNT EQUAL TO ZERO decision is YES, actions 230 to ASSERT ACCESS COMPLETE SIGNALS (146, FIG. 6) ON THE GLOBAL BUS are taken and the transition is made to the INTERRUPT 232 state; if the COUNT EQUAL TO ZERO decision is NO, transition is made to the GLOBAL NEW COUNT 234 state.

Figure 7G:
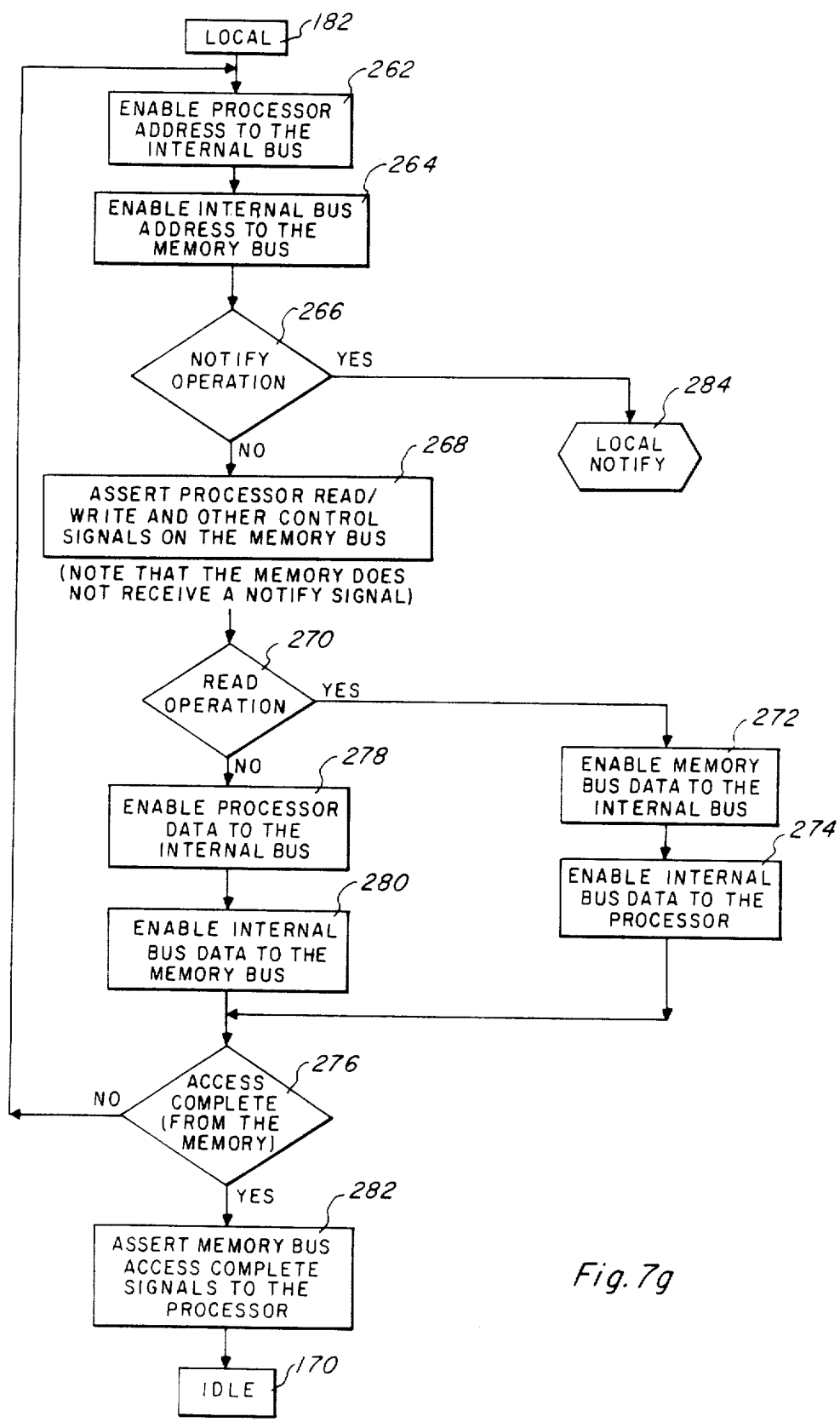
Figure 7H:
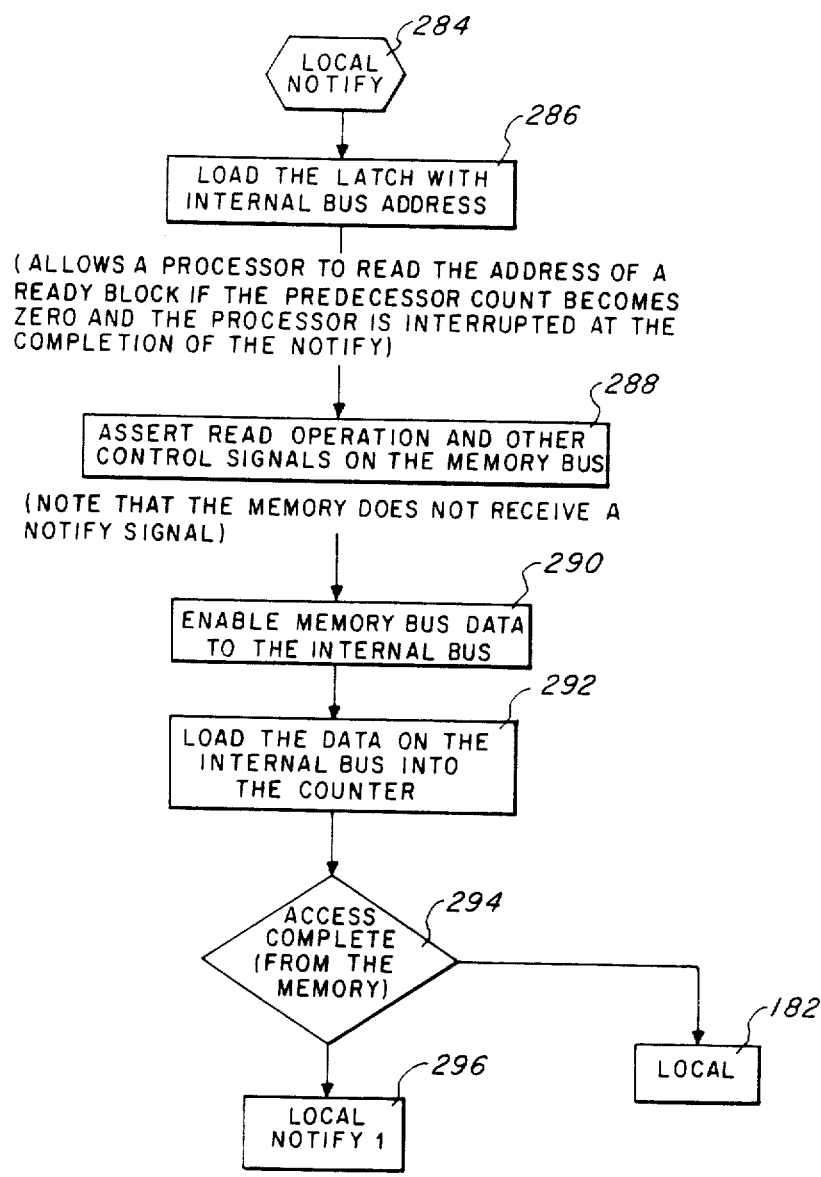
Figure 7I:
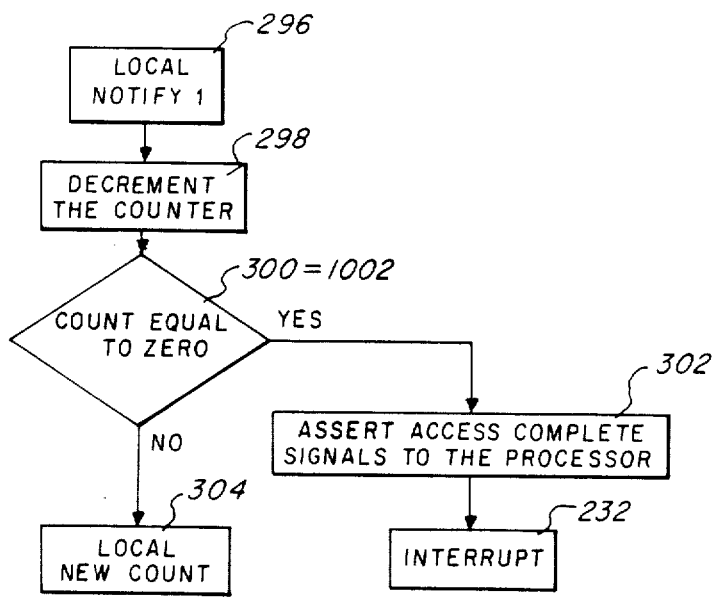
Figure 7J:
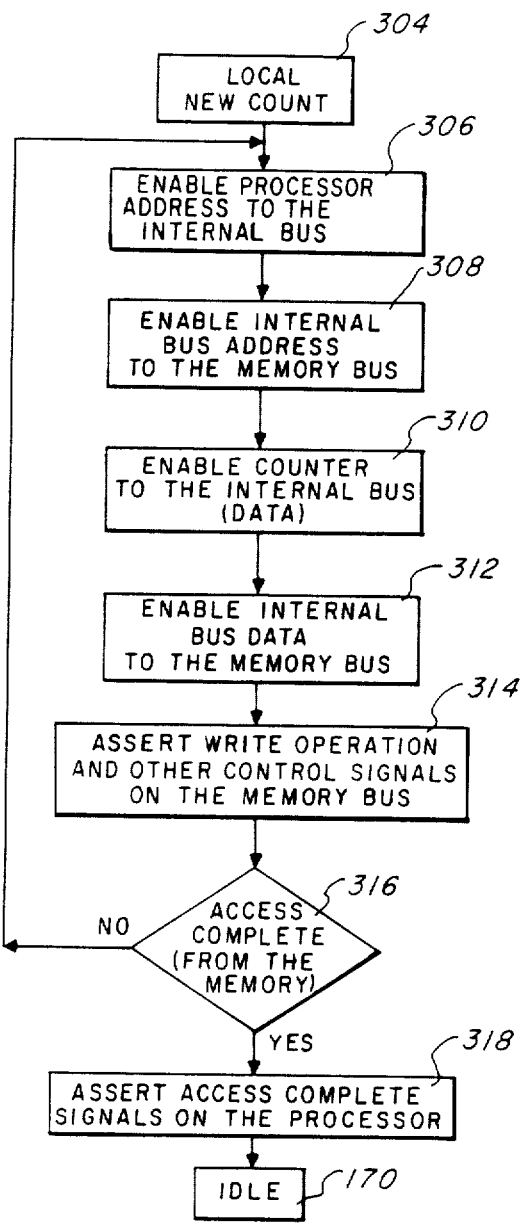
Figure 7K:
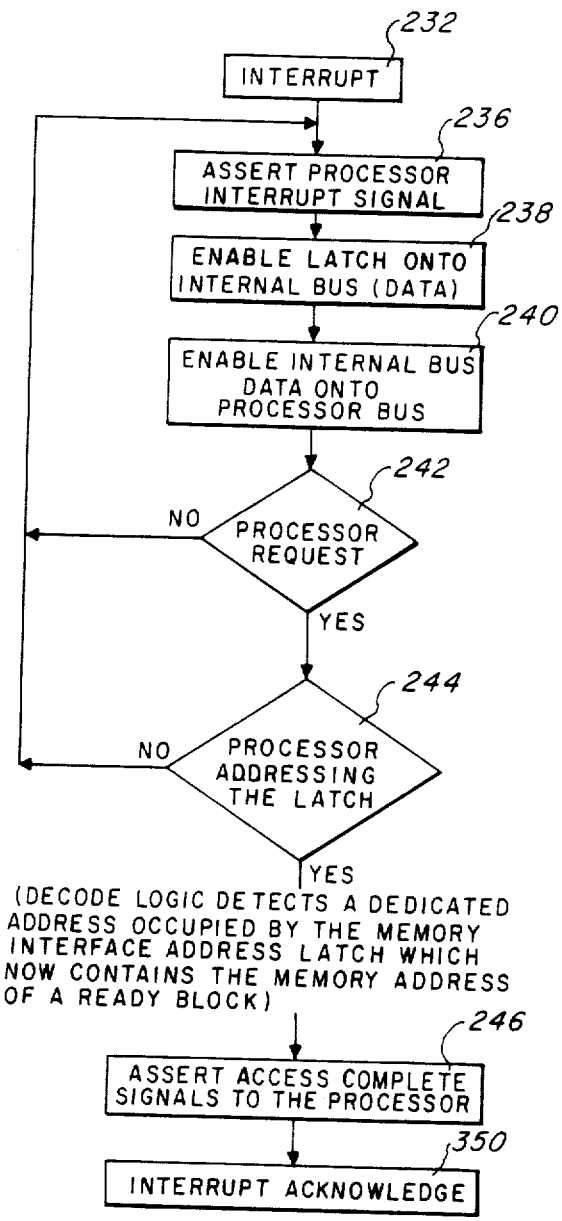
Figure 7L:
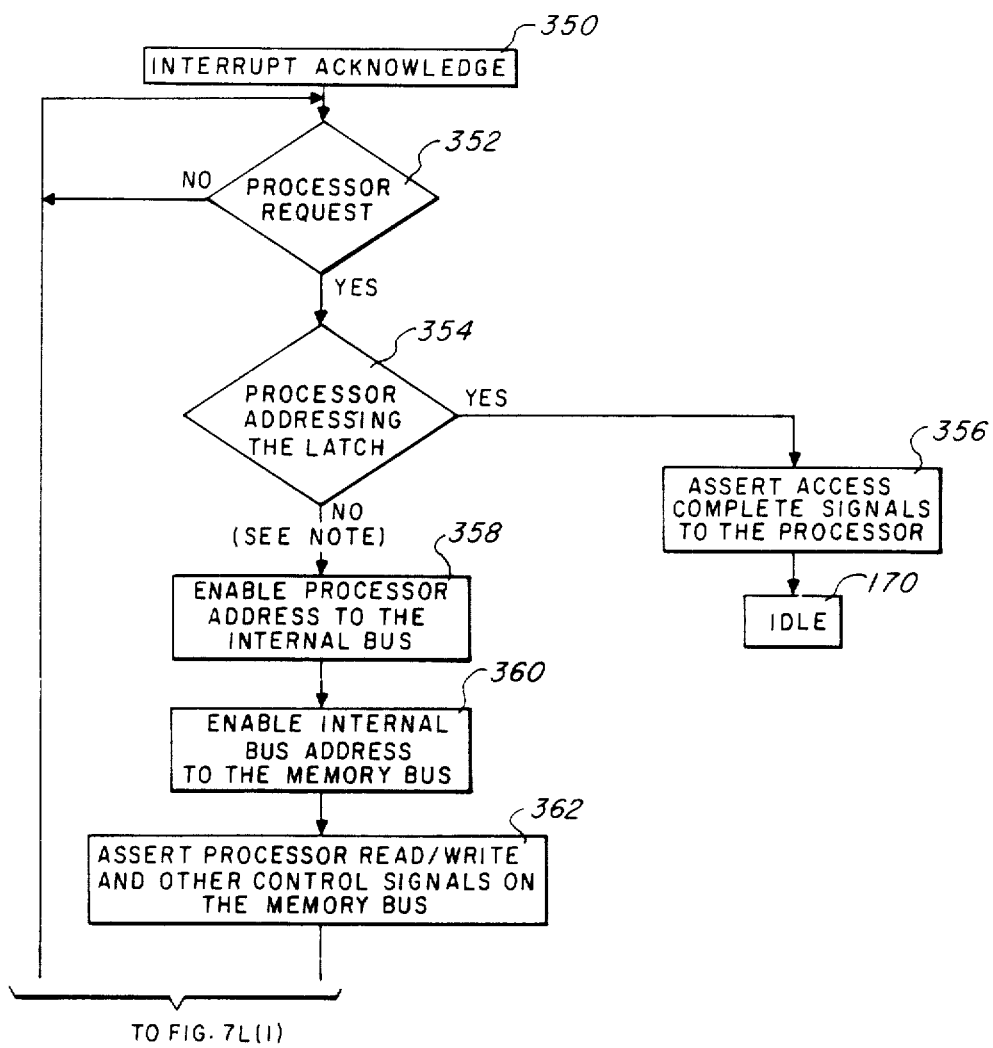

The INTERRUPT state 232 (FIG. 7k) begins with the assertion of signals as follows: an action 236 to ASSERT PROCESSOR INTERRUPT SIGNAL (line 150, FIG. 6), 238 to ENABLE LATCH (102, FIG. 5) ONTO INTERNAL BUS (96, FIG. 5) (line 140, FIG. 5) and a signal 240 to ENABLE INTERNAL BUS DATA (97 data portion, FIG. 5) ONTO PROCESSOR BUS (14 data portion, FIG. 1) (lead 140, FIG. 6). After actions 236–240 are taken a PROCESSOR REQUEST (158, FIG. 6) decision 242 is made, if NO then the INTERRUPT state is repeated. However, if the PRO- 5). After the actions 286-292 have been taken, an ACCESS COMPLETE decision 294 (from the memory, line 166, FIG. 6) is made. If the ACCESS COMPLETE decision 294 is YES, a transition is made to a LOCAL NOTIFY 1 296 state; if NO, the controller remains in the LOCAL state 182 (FIG. 7g).

The LOCAL NOTIFY 1 state 296 (FIG. 7i) begins with a DECREMENT THE COUNTER signal 298 (line 140, FIG. 5) after which a COUNT EQUAL TO ZERO (1002, FIG. 5) decision 300 is made. If the COUNT EQUAL TO ZERO decision is YES, actions 302 to ASSERT ACCESS COMPLETE SIGNALS TO THE PROCESSOR are taken (line 160, FIG. 6) and the INTERRUPT state 232 (FIG. k) previously described entered; if the COUNT EQUAL TO ZERO decision 300 is NO, then a transition is made to a LOCAL NEW COUNT 304 state.

The LOCAL NEW COUNT state 304 (FIG. 7j) begins with the assertion of signals as follows: an ENABLE PROCESSOR ADDRESS (14 address portion, FIG. 1) TO THE INTERNAL BUS (97 address, FIG. 5) signal 306 (line 140, FIG. 5), ENABLE INTERNAL BUS ADDRESS (97 address, FIG. 5) TO THE MEMORY BUS (18 address, FIG. 1) signal 308 (line 140, FIG. 5), ENABLE COUNTER (110, FIG. 5) TO THE INTERNAL BUS (DATA) (96, FIG. 5) signal 310 (line 140, FIG. 5), ENABLE INTERNAL BUS DATA (97 data, FIG. 5) TO THE MEMORY BUS (18 data, FIG. 1) signal 312 (line 140, FIG. 6), and ASSERT WRITE OPERATION (164, FIG. 6) AND OTHER CONTROL SIGNALS (168, FIG. 6) ON THE MEMORY BUS actions 314. Operations 306-314 are followed by an ACCESS COMPLETE decision 316 (from the memory, line 166, FIG. 6). If the ACCESS COMPLETE decision 316 is NO, the LOCAL NEW COUNT state is repeated; if YES, an ASSERT ACCESS COMPLETE SIGNALS TO THE PROCESSOR (line 160, FIG. 6) action 318 is taken and the system returned to the IDLE 170 (FIG. 7a) state.

Returning now to the GLOBAL BUS ACCESS GRANTED (146, 146', FIG. 6) decision 186 of FIG. 7a wherein if the decision is YES the transition is made to the REMOTE state 188, the REMOTE state 188 (FIG. 7b) begins with actions being taken as follows: an ENABLE PROCESSOR ADDRESS (14 address, FIG. 1) TO THE INTERNAL BUS (97 address, FIG. 5) signal 320 (line 140, FIG. 5), ENABLE INTERNAL BUS ADDRESS (97 address, FIG. 5) TO THE GLOBAL BUS (22 address, FIG. 1) signal 322 (line 140, FIG. 5) and ASSERT PROCESSOR READ/WRITE (line 156, FIG. 6) NOTIFY (line 154, FIG. 6) AND OTHER CONTROL SIGNALS ON THE GLOBAL BUS (142, 144, 146, FIG. 6) actions 324. After operations 320-324, a READ OPERATION decision 326 is made (line 156, FIG. 6); if YES, an ENABLE GLOBAL BUS DATA (22 data, FIG. 1) TO THE INTERNAL BUS (97 data, FIG. 5) signal 328 (line 140, FIG. 5) and an ENABLE INTERNAL BUS DATA (97 data, FIG. 5) TO THE PROCESSOR BUS (14 data, FIG. 1) signal 330 (line 140, FIG. 5) are asserted and an ACCESS COMPLETE decision 332 made (line 146, FIG. 6). If the READ OPERATION decision 326 is NO, then an ENABLE PROCESSOR BUS DATA (14 data, FIG. 1) TO THE INTERNAL BUS (97 data, FIG. 5) signal 334 (line 140, FIG. 6) and an ENABLE INTERNAL BUS DATA (97 data, FIG. 5) TO THE GLOBAL BUS (22 data, FIG. 1) signal 336 (line 140, FIG. 6) are asserted and the ACCESS COMPLETE (146, FIG. 6) decision 332 made. If the ACCESS COMPLETE decision 306 is NO, the REMOTE state 168 is repeated; if YES, then an ASSERT GLOBAL BUS ACCESS COMPLETE (146, FIG. 6) SIGNALS TO THE PROCESSOR (160, FIG. 6) action 338 is taken and the system returned to the IDLE 170 (FIG. 7a) state.

In operation, the processor 12 (FIG. 1 requests the controller 130 of the memory interface 16 to perform a notification access. Thus, the memory (processor/memory) interface 16 includes a notification access as well as read and write accesses. The memory interface 16 determines whether the address of the access is in the local memory 20, if not the controller 130 of the memory interface 16 will route notification signals to the global memory interconnect bus 22. The global memory interconnect signal is a single additional logic signal which indicates that the access is a notification. The controller 130 will also accept notification accesses when the address of the access on the global interconnect references the controller's local memory 20.

The notification access is performed in the memory controller in which the predecessor count associated with the block being notified is resident in the same manner as a store or load actually executes in the memory controller 130 of the processor containing the address of the access. It will be appreciated that the conventional data lines of the memory system are not involved in the notification access. The conventional address lines carry the address of the access; a single additional control signal line to encode the access is the only required bus modification.

The memory interface 16 may be enhanced to be the hardware equivalent of a simple processor, in which case, it performs all of the data flow control operations including predecessor count decrement and pending block list maintenance in parallel with execution in the conventional processor. Thus the processor 12 and the memory interface controller 130 are required to communicate (for block sequencing related purposes) only during the activation of a new block of instructions. Although the sophisticated memory interface is preferred, the simplest way to cause the predecessor count to be decremented following receipt of a notification is to interrupt the local processor whereby a software routine then decrements the predecessor count, tests it for a value of zero, and if zero either begins execution of the receiving block or places it on a ready block list. Code at the end of a block is used to check the ready block list for further work to do. In this embodiment the memory interface controller is only required to generate an interrupt and hold the address of the access in a manner in which it can be used by the software activated by the interrupt. The embodiment described is somewhere between these two approaches.

The significance of the instructions which trigger memory accesses (such as notifications) will be appreciated by those skilled in the art. These instructions may be implemented as parts of other instructions or combinations of other instructions.

In data flow sequencing, a data transfer operation can be paired with notification to provide a single instruction used to transfer data and notify the receiving block that the data is available. Also in data flow sequencing, a combination of instructions can be used to add a notification instruction to existing processors. In the TI 9900 microprocessor, the processor could set a central register unit (CRU) bit which would indicate to the memory controller 130 that the next read or write access is to be interpreted as a notification access. The bit would be reset following the access.

Although preferred embodiments of the invention have been described in detail, it will be appreciated by those persons skilled in the art that various changes, substitutions, and alterations can be made therein without departing from the scope of the invention as defined by the appended claims.

What is claimed is:

1. A multiprocessor comprising:
   (a) a plurality of processor systems, each processor system comprising memory means for storage of instructions and data, processor means for processing data responsive to predetermined instructions and memory interface means coupled to said memory means and said processor means for interfacing said memory means and said processor means,
   (b) a global bus interconnecting said memory interface means of each of said processor systems,
   (c) each said processor means including means to provide first instruction data including an address to its associated memory interface means,
   (d) each said memory interface means including means responsive to said first address signal from its associated processor means and non-coincidence of said first address signal in its associated memory to provide a second instruction data including an address signal on said global bus, and
   (e) means at each said memory interface means other than the memory interface providing said second instruction data including an address signal and responsive to said second instruction data signal to provide operation of its associated processor means and memory means in accordance with and responsive to said instruction data signal on said global bus.

2. A multiprocessor as set forth in claim 1, wherein each said memory interface means further includes means responsive to said first instruction data including an address signal from its associated processor and a coincidence of said first address signal in its associated memory means to inhibit said second instruction data including an address signal and to provide operation of its associated processor means and memory means in accordance with instructions from its associated processor means.

3. A multiprocessor as set forth in claim 2 wherein said memory interface further includes a first plurality of transceivers coupled to said global bus for transmitting and receiving a said second instruction data including an address signal on said global bus.

4. A multiprocessor as set forth in claim 3 wherein said memory interface further includes a plurality of buffers and a second plurality of transceivers coupled to said associated processor means for receiving and processing a said first instruction data including an address signal from said associated processor means.

5. A multiprocessor as set forth in claim 2 wherein said memory interface further includes a plurality of buffers and a plurality of transceivers coupled to said associated processor means for receiving and processing a said first instruction data including an address signal from said associated processor means.

6. A multiprocessor as set forth in claim 1 wherein said memory interface further includes a first plurality of transceivers coupled to said global bus for transmitting and receiving a said second instruction data including an address signal on said global bus.

7. A multiprocessor as set forth in claim 6 wherein said memory interface further includes a plurality of buffers and a second plurality of transceivers coupled to said associated processor means for receiving and processing a said first instruction data including an address signal from said associated processor means.

8. A multiprocessor as set forth in claim 1 wherein said memory interface further includes a plurality of buffers and a plurality of transceivers coupled to said associated processor means for receiving and processing a said first instruction data including an address signal from said associated processor means.

9. A multiprocessor process, comprising the steps of:
   (a) providing a plurality of processor systems, each processor system comprising memory means for storage of instructions and data, processor means for processing data responsive to predetermined instructions and memory interface means coupled to said memory means and said processor means,
   (b) providing a global bus interconnecting said memory interface means of each said processor system,
   (c) providing first instruction data including an address signal at one of said processor means and sending said first instruction data including an address signal to memory interface means associated with said one processor means,
   (d) providing a second instruction data including an address signal from said memory interface means associated with said one processor means to said global bus responsive to said first instruction data including an address signal from said associated processor means and a non-coincidence of said first address signal in said associated memory bus, and
   (e) providing operation of said associated processor means and memory means of a second of said processor systems responsive to said second instruction data including an address signal on said global bus from said memory interface means associated with said one processor means in accordance with and responsive to said instruction data signal on said global bus.

10. A multiprocessor process as set forth in claim 9, further including the step of inhibiting said second instruction data including an address signal and providing operation of its associated processor means and memory means in accordance with instructions from said processor means responsive to said first instruction data including an address signal from its associated processor and a coincidence of said first address signal in its associated memory means.

11. A multiprocessor process as set forth in claim 10, further including providing a first plurality of transceivers coupled to said global bus for transmitting and receiving a said second instruction data including an address signal on said global bus.

12. A multiprocessor process as set forth in claim 11, further including providing a plurality of buffers and a second plurality of transceivers coupled to said associated processor means for receiving and processing a said first instruction data including an address signal from said associated processor means.

13. A multiprocessor process as set forth in claim 10, further including providing a plurality of buffers and a plurality of transceivers coupled to said associated processor means for receiving a said first instruction data including an address signal from said associated processor means.

14. A multiprocessor process as set forth in claim 9, further including providing a first plurality of transceivers coupled to said global bus for transmitting and receiving a said second instruction data including an address signal on said global bus.

15. A multiprocessor process as set forth in claim 14, further including providing a plurality of buffers and a second plurality of transceivers coupled to said associated processor means for receiving and processing a said first instruction data including an address signal from said associated processor means.

16. A multiprocessor process as set forth in claim 9, further including providing a plurality of buffers and a plurality of transceivers coupled to said associated processor means for receiving a said first instruction data including an address signal from said associated processor means.

17. A multiprocessor process comprising the steps of:
(a) providing a plurality of processor systems, each processor system comprising memory interface means coupled to memory means for storage of instructions and data and processor means for processing data responsive to predetermined instructions and a global bus interconnecting each of said memory interface means,
(b) providing an instruction data including address signal from a predetermined one of said processor means to its associated memory interface means,
(c) determining the contents of the memory means associated with said memory interface means in response to said instruction data including address signal to obtain processing in said processing system in response to a non-coincidence of said first address signal,
(d) providing an instruction data including address signal on said global bus in response to non-coincidence of said first address signal in said memory means in step (c), and
(e) operating on said instruction data at a second of said processor systems in response to said instruction data.

18. A multiprocessor comprising:
(a) a plurality of processor systems, each processor system comprising memory means for storage of instructions and data, processor means for processing data responsive to predetermined instructions and memory interface means coupled to said memory means and said processor means for interfacing said memory means and said processor means,
(b) a global bus interconnecting said memory interface means of each of said processor systems,
(c) each said processor means including means to provide first instruction data including a first notify signal to its associated memory interface means,
(d) each said memory interface means including means responsive to said first notify signal from its associated processor means and non-coincidence of said notify signal in its associated memory to provide second instruction data including a second notify signal on said global bus, and
(e) means at each said memory interface means other than the memory interface providing said second instruction data including a second notify signal and responsive to said second notify signal to provide operation of its associated processor means and memory means in accordance with and responsive to said instruction data on said global bus.

19. A multiprocessor as set forth in claim 18, wherein each said memory interface means further includes means responsive to said first instruction data including said notify signal from its associated processor and a second predetermined condition of its associated memory means to inhibit said second notify signal and to provide operation of its associated processor means and memory means in accordance with instructions from said processor means.

20. A multiprocessor as set forth in claim 19 wherein said memory interface further includes a plurality of transceivers coupled to said global bus for transmitting and receiving a said second instruction data including said notify signal on said global bus.

21. A multiprocessor as set forth in claim 20 wherein said memory interface further includes a plurality of buffers and a second plurality of transceivers coupled to said associated processor means for receiving and processing a said first instruction data including said notify signal from said associated processor means.

22. A multiprocessor as set forth in claim 19 wherein said memory interface further includes a plurality of buffers and a second plurality of transceivers coupled to said associated processor means for receiving and processing a said first instruction data including said notify signal from said associated processor means.

23. A multiprocessor as set forth in claim 18 wherein said memory interface further includes a plurality of transceivers coupled to said global bus for transmitting and receiving said second instruction data including said notify signal on said global bus.

24. A multiprocessor as set forth in claim 23 wherein said memory interface further includes a plurality of buffers and a second plurality of transceivers coupled to said associated processor means for receiving and processing a said first instruction data including said notify signal from said associated processor means.

25. A multiprocessor as set forth in claim 18 wherein said memory interface further includes a plurality of buffers and a second plurality of transceivers coupled to said associated processor means for receiving and processing a said first instruction data including said notify signal from said associated processor means.

26. A multiprocessor process, comprising the steps of:
(a) providing a plurality of processor systems, each processor system comprising memory means for storage of instructions and data, processor means for processing data responsive to predetermined instructions and memory interface means coupled to said memory means and said processor means,
(b) providing a global bus interconnecting said memory interface means of each said processor system,
(c) providing first instruction data including a notify signal at one of said processor means and sending said first instruction data including a notify signal to its associated memory interface means,
(d) providing second instruction data including a notify signal from said associated memory interface means to said global bus responsive to said first instruction data including a notify signal from its associated processor means and a non-coincidence of said first notify signal in said associated memory bus, and
(e) providing operation of said associated processor means and memory means responsive to a second notify signal on said global bus from a non-associated memory interface means in accordance with and responsive to instructions on said global bus.

27. A multiprocessor process as set forth in claim 26, further including the step of inhibiting said second said second instruction data including said second notify signal and providing operation of its associated processor means and memory means in accordance with instructions from said processor means responsive to said first instruction data including said first notify signal from its associated processor and a second predetermined condition of its associated memory means.

28. A multiprocessor process as set forth in claim 27, further including providing a plurality of transceivers coupled to said global bus for transmitting and receiving a said second instruction data including said second notify signal on said global bus.

29. A multiprocessor process as set forth in claim 28, further including providing a plurality of buffers and a second plurality of transceivers coupled to said associated processor means for receiving and processing a said first instruction data including a notify signal from said associated processor means.

30. A multiprocessor process as set forth in claim 27, further including providing a plurality of buffers and a second plurality of transceivers coupled to said associated processor means for receiving a said first instruction data including a notify signal from said associated processor means.

31. A multiprocessor process as set forth in claim 26, further including providing a plurality of transceivers coupled to said global bus for transmitting and receiving a said second instruction data including said second notify signal on said global bus.

32. A multiprocessor process as set forth in claim 31, further including providing a plurality of buffers and a second plurality of transceivers coupled to said associated processor means for receiving and processing said first instruction data including a notify signal from said associated processor means.

33. A multiprocessor process as set forth in claim 26, further including providing a plurality of buffers and a second plurality of transceivers coupled to said associated processor means for receiving a said first instruction data including a notify signal from said associated processor means.

34. A multiprocessor process comprising the steps of:
(a) providing a plurality of processor systems, each processor system comprising memory interface means coupled to memory means for storage of instructions and data and processor means for processing data responsive to predetermined instructions and a global bus interconnecting said memory interface means,
(b) providing instruction data including a first notify signal from a predetermined one of said processor means to its associated memory interface means,
(c) determining the contents of the memory means associated with said memory interface means in response to said instruction data including said first notify signal to obtain processing in said processing system in response to a first predetermined condition,
(d) providing a second instruction data including a second notify signal on said global bus in response to a second predetermined condition in step (c), and
(e) operating on said instruction data at a second of said processor systems in response to said instruction data.

* * * * *